US008004510B2

(12) United States Patent
Endo

(10) Patent No.: US 8,004,510 B2
(45) Date of Patent: Aug. 23, 2011

(54) CONTROL CIRCUIT OF DISPLAY DEVICE, AND DISPLAY DEVICE, AND DISPLAY DEVICE AND ELECTRONIC APPLIANCE INCORPORATING THE SAME

(75) Inventor: Masami Endo, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 12/959,667

(22) Filed: Dec. 3, 2010

(65) Prior Publication Data

US 2011/0074801 A1 Mar. 31, 2011

Related U.S. Application Data

(62) Division of application No. 11/561,975, filed on Nov. 21, 2006, now Pat. No. 7,847,793.

(30) Foreign Application Priority Data

Dec. 8, 2005 (JP) ................................ 2005-354222

(51) Int. Cl.
*G06F 3/038* (2006.01)

(52) U.S. Cl. ........................................ 345/204; 345/98

(58) Field of Classification Search .................... 345/88, 345/98–99, 204, 213, 534, 535, 539, 541, 345/545–547
See application file for complete search history.

(56) References Cited

U.S. PATENT DOCUMENTS

| | | | |
|---|---|---|---|
| 5,990,629 | A | 11/1999 | Yamada et al. |
| 6,025,822 | A | 2/2000 | Motegi et al. |
| 6,222,515 | B1 | 4/2001 | Yamaguchi et al. |
| 6,611,108 | B2 | 8/2003 | Kimura |
| 7,032,413 | B1 | 4/2006 | Specktor |
| 7,486,265 | B2 | 2/2009 | Hosaka et al. |
| 2001/0035849 | A1 | 11/2001 | Kimura et al. |
| 2001/0035863 | A1 | 11/2001 | Kimura |
| 2002/0005846 | A1 | 1/2002 | Hiroki et al. |
| 2002/0024508 | A1 | 2/2002 | Nakamura et al. |
| 2003/0174138 | A1 | 9/2003 | Shibayama |
| 2003/0174153 | A1 | 9/2003 | Koyama |
| 2004/0080521 | A1 | 4/2004 | Nose et al. |
| 2004/0090404 | A1 | 5/2004 | Endo et al. |

(Continued)

FOREIGN PATENT DOCUMENTS

CN 1438571 A 8/2003

(Continued)

OTHER PUBLICATIONS

Office Action (Chinese Patent Application No. 200610164191.0) mailed May 4, 2011, with translation.

*Primary Examiner* — Amare Mengistu
*Assistant Examiner* — Hong Zhou
(74) *Attorney, Agent, or Firm* — Fish & Richardson P.C.

(57) ABSTRACT

An object is to realize downsizing and cost reduction of a display device by efficiently using a physical region of a memory in a control circuit of the display device. A structure of a video data storage portion of the control circuit is that provided with a video data storage portion for storing video data of an n-th frame (n is a natural number), a video data storage portion for storing video data of an (n+1)th frame, and a video data storage portion for sharing video data of the n-th frame and the (n+1)th frame among received video data.

5 Claims, 12 Drawing Sheets

U.S. PATENT DOCUMENTS

| | | | |
|---|---|---|---|
| 2005/0270254 | A1 | 12/2005 | Ozaki |

FOREIGN PATENT DOCUMENTS

| | | | |
|---|---|---|---|
| EP | 0484159 | A2 | 5/1992 |
| EP | 1094438 | A1 | 4/2001 |
| EP | 1339037 | A1 | 8/2003 |
| EP | 1638074 | A2 | 3/2006 |
| JP | 04-116688 | A | 4/1992 |
| JP | 04-291395 | A | 10/1992 |
| JP | 05-072998 | A | 3/1993 |
| JP | 2001-343924 | A | 12/2001 |
| JP | 2002-006808 | A | 1/2002 |
| JP | 2002-014653 | A | 1/2002 |
| JP | 2004-163919 | A | 6/2004 |
| WO | WO 98/33165 | A1 | 7/1998 |

CONTROL CIRCUIT OF DISPLAY DEVICE, AND DISPLAY DEVICE, AND DISPLAY DEVICE AND ELECTRONIC APPLIANCE INCORPORATING THE SAME

CROSS-REFERENCE TO RELATED APPLICATIONS

This application is a divisional of U.S. application Ser. No. 11/561,975, filed Nov. 21, 2006, now allowed, which claims the benefit of a foreign priority application filed in Japan as Ser. No. 2005-354222 on Dec. 8, 2005, both of which are incorporated by reference.

BACKGROUND OF THE INVENTION

1. Field of the Invention

The present invention relates to a display device and a driving method for the display device, and particularly relates to a control circuit of a display panel using a light emitting element in a pixel. A control circuit of a memory is a circuit that controls writing to and reading from the memory, typified by an SRAM (Static Random Access Memory).

Note that the control circuit of a display panel mentioned here is a circuit which converts received video data so that gray scale expression in a pixel of the display panel becomes possible, and writes in a storage means and outputs the video data read from the storage means to the display panel for displaying.

Note that the display device is structured by a display and a peripheral circuit that inputs signals to the display.

2. Description of the Related Art

In recent years, as a display device for replacing liquid crystal display devices (LCD), there is a light emitting device that is structured by a display panel in which a light emitting element is placed in every pixel, and a peripheral circuit that inputs signals to the panel, and that carries out image display by controlling light emission of the light emitting elements.

The development of a light emitting device using a module structured by light emitting elements arranged in a matrix form is widely pursued, and EL elements are receiving attention.

In such a light emitting device, two or three TFTs (thin film transistor) are typically placed in every pixel. By controlling on/off of those TFTs, luminance and light emission/non-emission of a light emitting element of each pixel are controlled. Further, a driver circuit for controlling on/off of the TFTs of each pixel is provided in a peripheral portion of a pixel portion of the display panel.

Here, a variety of elements can be used for a light emitting element of the present specification. For example, an OLED element; an inorganic light emitting diode element or another light emitting diode element; an inorganic EL (Electroluminescence) element or another solid system light emitting element; an FED element or another vacuum system light emitting element, or the like are given. Note that an OLED element includes an anode, a cathode, and an organic light emitting layer interposed between the anode and the cathode.

As a method for expressing gray scale of a pixel of a structure such as that of the foregoing, there are two main methods of an analog method and a digital method. The digital method is advantageous compared to the analog method in that it is resistant to variation in TFT characteristics. As a gray scale expression method of the digital method, a time gray scale method and an area gray scale method are given.

The time gray scale method is a method for expressing gray scale by controlling a period in which each pixel of a display device emits light. If a period in which one image is displayed is one frame period, the one frame period is divided into a plurality of sub-frame periods. Gray scale of each pixel is expressed by having each pixel be lighted or not lighted in each sub-frame period as well as changing a display period of each sub-frame period, and controlling a total period of light emission by selecting a combination of sub-frame periods in which each pixel lighted.

The area gray scale method is a method for expressing gray scale by controlling an area of a portion in each pixel of the display device that emits light. Specifically, the area gray scale method is a method for expressing gray scale of each pixel by dividing each pixel into sub-pixels and changing the number of sub-pixels that emit light.

Note that for a display device that expresses gray scale by the time gray scale method or the area gray scale method such as the foregoing, a control circuit that carries out format conversion of received video data into video data for time gray scale display or video data for area gray scale display, and outputs to the display panel is needed.

As the control circuit of such a display device, there is a circuit for a display device of a time gray scale method mentioned in Patent Document 1: Japanese Published Patent Application No. 2004-163919 for example, which is shown in FIG. 11. The control circuit in FIG. 11 is structured by a format conversion circuit including a format conversion portion 1401 that converts a first video data into a second video data for time gray scale; a first video memory 1402 and a second video memory 1403 for storing the format-converted second video data; a display control circuit including a display control portion 1404 that reads data from the first video memory 1402 or the second video memory 1403 and transmits the data to a display panel 1406; and a selection circuit 1405 for selecting a memory to which data is written and a memory from which data is read.

FIG. 12 shows a timing chart of a conventional control circuit. Video data input to the format conversion portion 1401 is converted to data suitable for the time gray scale method, and using the selection circuit 1405, data writing and data reading are alternated every one frame period. In other words, using the first video memory 1402 and the second video memory 1403, at a certain point in time, one memory is used for reading the video data and the other is used for writing.

At the same time as reading the first video data stored in the first video memory 1402 to a display control portion, a second video data corresponding to a subsequent frame period is written to the second video memory 1403 via the selection circuit.

In this manner, the control circuit of the display device in FIG. 11 includes the first video memory 1402 and the second video memory 1403 each of which can store digital video data for one frame period, and the second video data is sampled by alternately using the first video memory 1402 and the second video memory 1403.

SUMMARY OF THE INVENTION

In the conventional method mentioned in Patent Document 1, writing and reading of the second video data for all pixels are carried out in the first video memory 1402 and the second video memory 1403 for every one frame period. If video data input to the video data format conversion portion 1401 is converted to a 6-bit digital time gray scale data, as shown in FIG. 11, the 6-bit video data is stored in the first video memory 1402 as a video data 1100 of a first bit in an n-th frame (n is a natural number); a video data 1101 of a second bit in the n-th frame (n is a natural number); a video data 1102 of a third bit in the n-th frame (n is a natural number); a video data 1103 of a fourth bit in the n-th frame (n is a natural number); a video data 1104 of a fifth bit in the n-th frame (n is a natural number); and a video data 1105 of a sixth bit in the n-th frame (n is a natural number). Also, the 6-bit video data is stored in the second video memory 1403 as a video data 1106 of a first bit in an (n+1)th frame; a video data 1107 of a second bit in the (n+1)th frame; a video data 1108 of a third bit in the (n+1)th frame; a video data 1109 of a fourth bit in the (n+1)th frame; a video data 1110 of a fifth bit in the (n+1)th frame; and a video data 1111 of a sixth bit in the (n+1)th frame. Consequently, in order to store data to be stored in the first video memory 1402 and the second video memory 1403, a memory with a bit number of at least double the number of gray scale bits of all pixels is required. Therefore, in a case where the number of pixels is doubled lengthwise and widthwise, and the total number of pixels is increased by a power of two, a physical region of the memory required for storing the data to be stored in the first video memory 1402 and the second video memory 1403 increases by a power of two.

Also, in the structure mentioned in Patent Document 1, in a retrace period from when video data of one frame is written to all pixels of the display panel until video data of a subsequent frame is written, writing and reading with respect to the first video memory 1402 and the second video memory 1403 are not carried out; therefore, there is surplus in use efficiency of the physical region of the memory. However, in terms of a single memory, in carrying out writing and reading, there is a problem accompanying overwriting of data that accurate video data cannot be written to a pixel.

Also, to respond to the increase in video data to be written to the display panel by simply increasing the physical region of the video data for a specification for which memory capacities are set in advance such as an ASIC (Application Specific Integrated Circuit) or an FPGA (field programmable gate array), the only way is to additionally provide a new memory. Consequently, by an increase of a selection circuit such as a selector or a buffer of the newly provided memory, an area occupied by circuit elements over a substrate and the number of mounting pins are increased, which becomes an impediment in downsizing a product and in lowering manufacturing cost.

The present invention is devised in view of the foregoing problems, and an object thereof is to provide a control circuit of a display device that solves the foregoing problems and a display device and an electronic appliance in which the control circuit is incorporated.

In order to achieve the foregoing object, the following structure is devised in the present invention. In other words in the present invention, among video data that is received, a memory storing video data of an n-th frame (n is a natural number); a memory storing video data of an (n+1)th frame; and a memory sharing video data of the n-th frame and the (n+1)th frame are prepared.

One feature of a control circuit of a display device of the present invention is a structure including first to third video data storage means; a writing means to write video data in the first to third video data storage means; a selection means to alternate between writing of video data in the first video data storage means and writing of video data in the second video data storage means every one frame period; and a display control means to alternate between reading of video data from the first video data storage means and reading of video data from the second video data storage means every one frame period, by which writing of the video data and reading of the video data are carried out alternately in the first video data storage means and the second video data storage means, and video data read by the display control means is written in the third video data storage means by the writing means during a period in one frame period when video data of one image is not being received.

Another feature of a control circuit of a display device of the present invention is a structure including first to third video data storage means; a writing means to convert video data into video data including a plurality of bits and writing the video data in the first to third video storage means; a selection means to alternate between writing of video data in the first video data storage means and writing of video data in the second video data storage means every one frame period; and a display control means to alternate between reading of video data from the first video data storage means and reading of video data from the second video data storage means every one frame period, by which writing of the video data and reading of the video data are carried out alternately in the first video data storage means and the second video data storage means, and video data read by the display control means is written in the third video data storage means by the writing means during a period in one frame period when video data of one image is not being received.

Yet another feature of a control circuit of a display device of the present invention is a structure including first to sixth video data storage means; a writing means to write video data in the first to sixth video data storage means; a selection means to alternate between writing of video data in the first video data storage means and writing of video data in the second video data storage means every one frame period; and a display control means to alternate between reading of video data from the first video data storage means and reading of video data from the second video data storage means every one frame period, by which writing of the video data in the first video data storage means and the second video data storage means, and writing of the video data in the third video data storage means and the fourth video data storage means are each sequentially carried out in one frame period; writing of the video data and reading of the video data in the first video data storage means and the second video data storage means, and writing of the video data and reading of the video data in third video data storage means and the fourth video data storage means are alternately carried out; and video data read by the display control means is written in the fifth video data storage means and the sixth video data storage means by the writing means during a period in one frame period when video data of one image is not being received.

Still another feature of a control circuit of a display device of the present invention is a structure including first to sixth video data storage means; a writing means to convert video data into video data including a plurality of bits and writing the video data in the first to sixth video data storage means; a selection means to alternate between writing of video data in the first video data storage means and writing of video data in the second video data storage means every one frame period; and a display control means to alternate between reading of video data from the first video data storage means and reading of video data from the second video data storage means, by which writing of the video data in the first video data storage means and the second video data storage means, and writing of the video data in the third video data storage means and the fourth video data storage means are each sequentially carried out in one frame period; writing of the video data and reading of the video data in the first video data storage means and the second video data storage means, and writing of the video data and reading of the video data in the third video data storage means and the fourth video data storage means are alternately carried out; and video data read by the display control means is written in the fifth video data storage means and the sixth video data storage means by the writing means during a period in one frame period when video data of one image is not being received.

Also, the present invention may be a structure including a control circuit of a display device of the present invention and a display panel in which a light emitting element is provided for every pixel.

Further, in the present invention, the light emitting element may be an EL element.

According to the present invention, in a control circuit of a display device, video data of an arbitrary bit in the n-th frame and video data of an arbitrary bit in the (n+1)th frame can be stored in a common memory, and reading from and writing in the memory can be carried out. Consequently, compared to the case of simply providing necessary memory in addition, efficient use of a physical region of the memory is possible. Therefore, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Also, according to the present invention, in a control circuit of a display device, video data of an arbitrary bit in the n-th frame and video data of an arbitrary bit in the (n+1)th frame are not necessary to be selected by a selection circuit such as a selector. Consequently, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

DETAILED DESCRIPTION OF THE INVENTION

Figure 1:
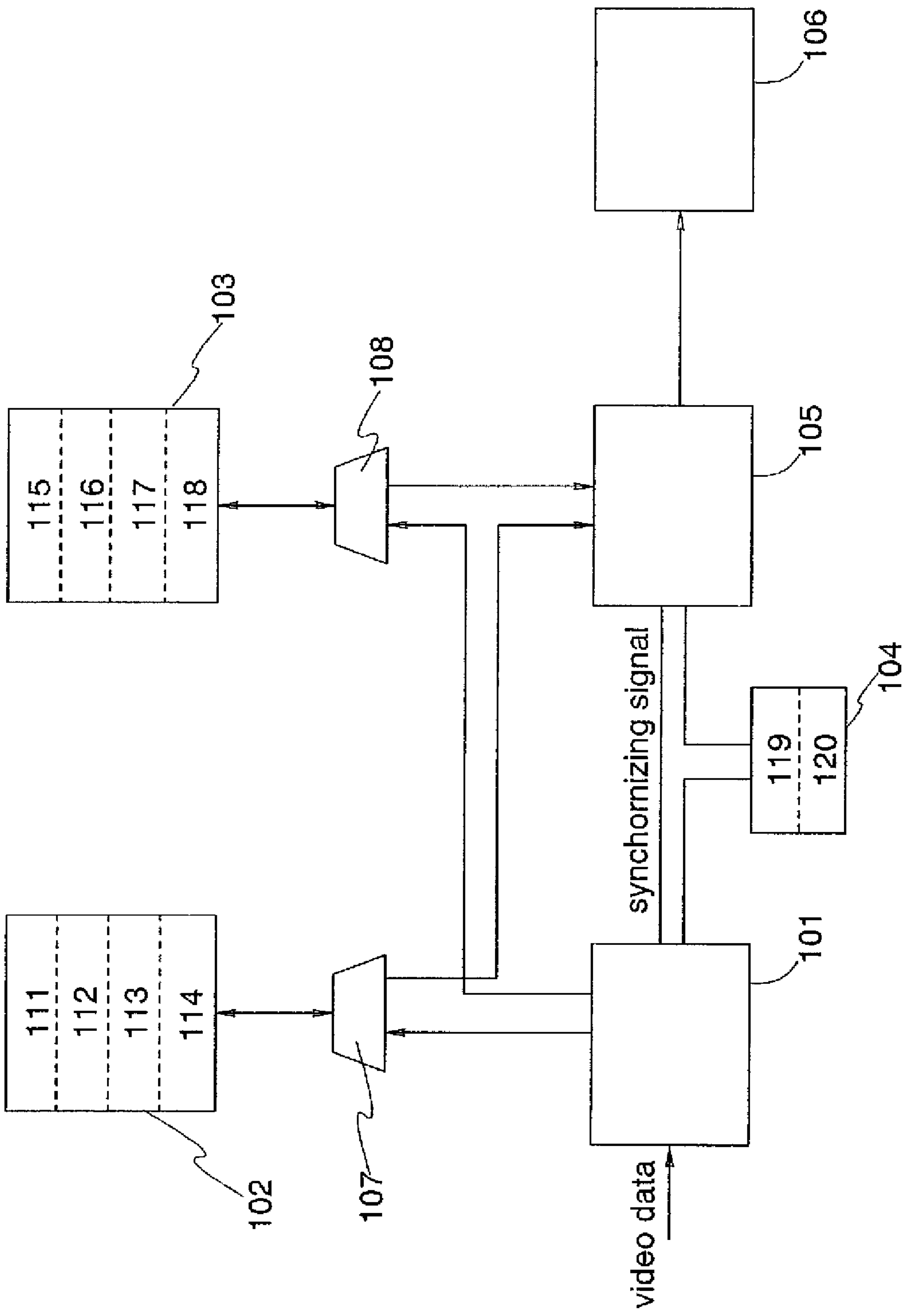
FIG. 1 is a block diagram showing a display device control circuit using the present invention.

Embodiment modes of the present invention will hereinafter be described with reference to drawings. However, the invention is not limited to the following description, and it is easily understood by those skilled in the art that the modes and details can be changed in various ways without departing from the spirit and scope of the invention. Therefore, the invention is not interpreted limited to the following description of embodiment modes. In the structure of the invention described hereinafter, reference numerals indicating the same things are used in common in different drawings.

Embodiment Mode 1

FIG. 1 schematically shows a structural example of a control circuit of a display device according to the present invention. This control circuit is structured by a video data format conversion portion 101, a first video data storage portion 102, a second video data storage portion 103, a third video data storage portion 104, a display control portion 105, and a display panel 106. When the video data format conversion portion 101 receives video data, the video data format conversion portion 101 converts a format of the video data into a format of a video data with which gray scale expression in a pixel of the display panel is possible, for example, into a format of a video data for time gray scale display if a display device is of a time gray scale method. The video data format conversion portion 101 writes video data for time gray scale display in the first video data storage portion 102 or the second video data storage portion 103 via a selector 107 or a selector 108, respectively, which is a selection means, as a writing means. Further, as a writing means, the video data format conversion portion 101 writes video data for time gray scale display in the third video data storage portion 104.

Note that instead of the selector 107 and the selector 108, another connection control means such as an analog switch or a tristate buffer may be used.

The display control portion 105 which is a display control means reads video data from the first video data storage portion 102 or the second video data storage portion 103 via the selector 107 or the selector 108, and outputs the video data to the display control portion. Then, the display control portion 105 transmits video data that is selected by the selector 108 to the display panel in synchronization with a timing of display.

Figure 11:
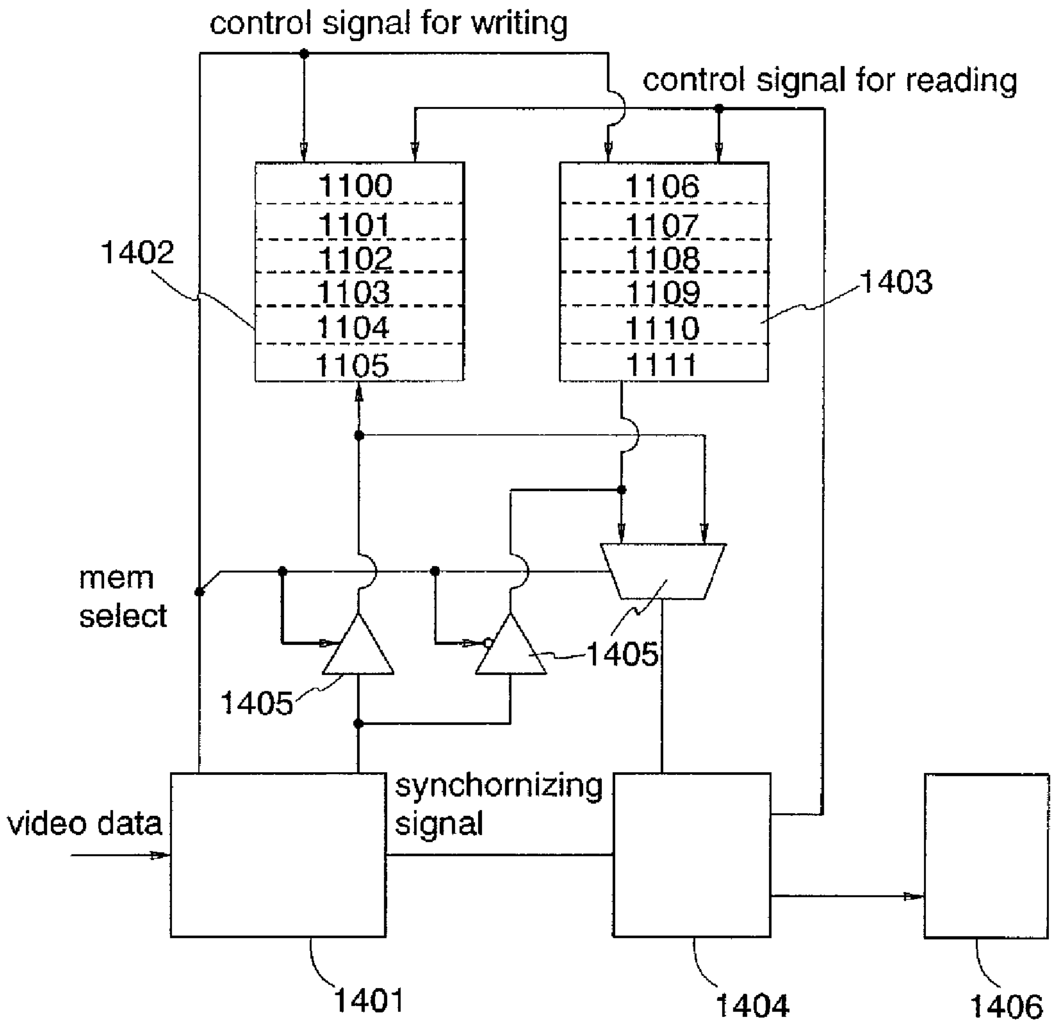
FIG. 11 is a figure showing a block diagram of a conventional example.
Figure 12:
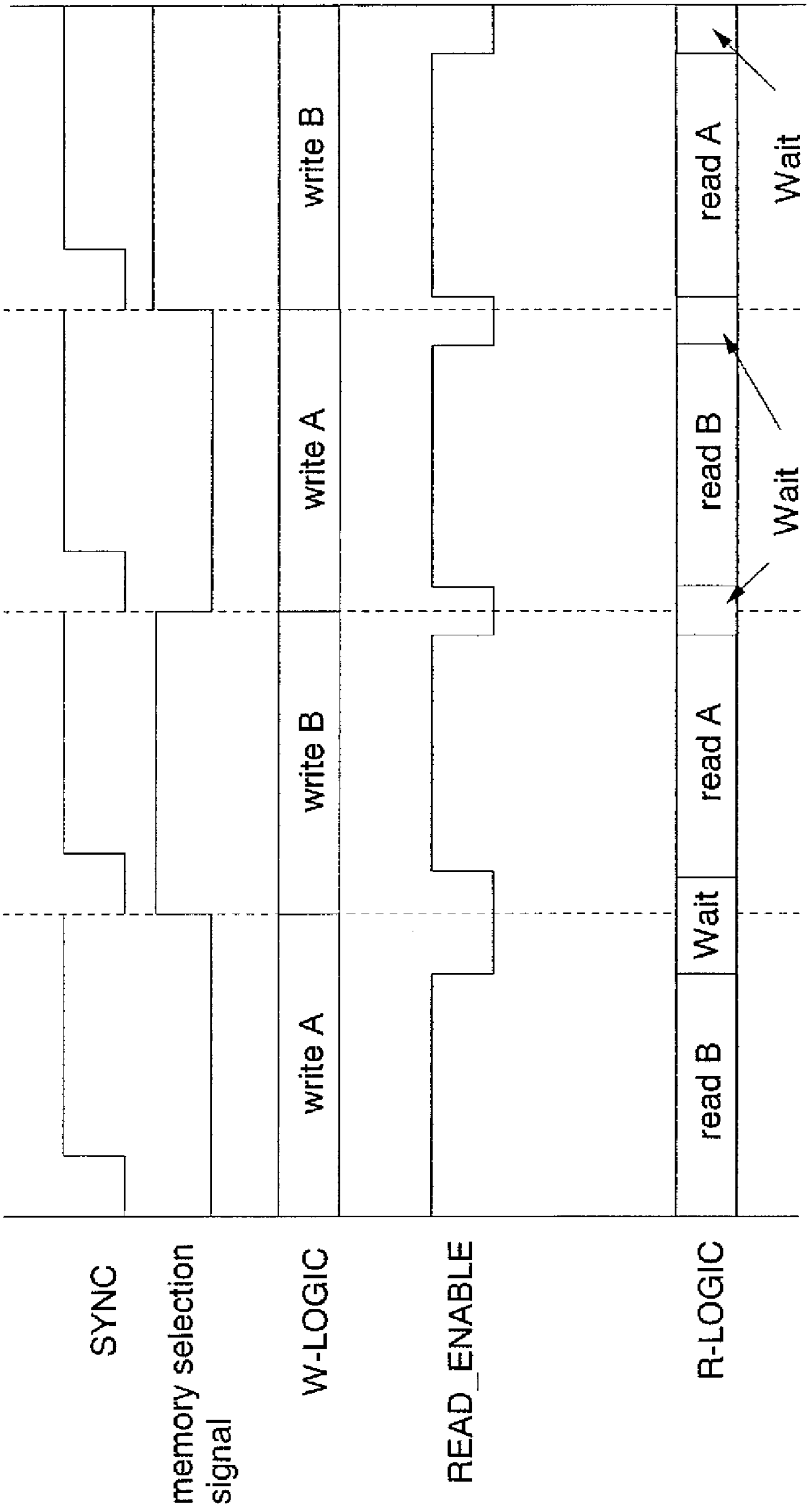
FIG. 12 is a figure showing a timing chart of an operation of a conventional example.

Note that in this embodiment mode, a description is made on an example of converting video data that is input to the video data format conversion portion 101 into a 6-bit digital time gray scale data, to also make a comparison with FIG. 11 which is a conventional example. Of course, in addition, video data input to the format conversion portion is not limited to that of six bits, if a format of the video data is converted into that for a time gray scale method or an area gray scale method.

A point that is different from a conventional technique is that the third video data storage portion 104 is provided. In an address region of the third video data storage portion 104, video data of an i-th bit (i is $1<i<6$; in a case where the video data is format-converted to six bits) in an n-th frame (n is a natural number) and video data of an i-th bit in an (n+1)th frame are stored. In other words, video data of the n-th frame and the (n+1)th frame are stored in common in the third video data storage portion 104.

Subsequently, a circuit structure is described using FIG. 1. First, video data is input to the video data format conversion portion 101. The video data format conversion portion 101 carries out format conversion of the video data into video data with which gray scale expression is possible, for example, into video data for time gray scale display if a display device is of a time gray scale method, and data of each gray scale bit is written in the first video data storage portion 102, the second video data storage portion 103, or the third video data storage portion 104. Further, at the same time, the display control portion 105 reads the video data written in the first video data storage portion 102, the second video data storage portion 103, or the third video data storage portion 104 and outputs the video data to the display panel 106.

Here, a region of a memory to which format-converted video data is written is described. The first video data storage portion 102 includes a memory region 111, a memory region 112, a memory region 113, and a memory region 114, and in a similar manner, the second video data storage portion 103 includes a memory region 115, a memory region 116, a memory region 117, and a memory region 118. Also, the third video data storage portion 104 includes a memory region 119 and a memory region 120. Video data of an n-th frame is stored in the first video data storage portion 102 and video data of an (n+1)th frame is stored in the second video data storage portion 103. Video data of the n-th frame and video data of the (n+1)th frame during a period in one frame period when video data of one image is not being received, in other words a period in which video data is output to a display panel and the image is not being received, are stored in the third video data storage portion 104.

Subsequently, a timing chart of video data is described with reference to FIG. 2.

Figure 2:
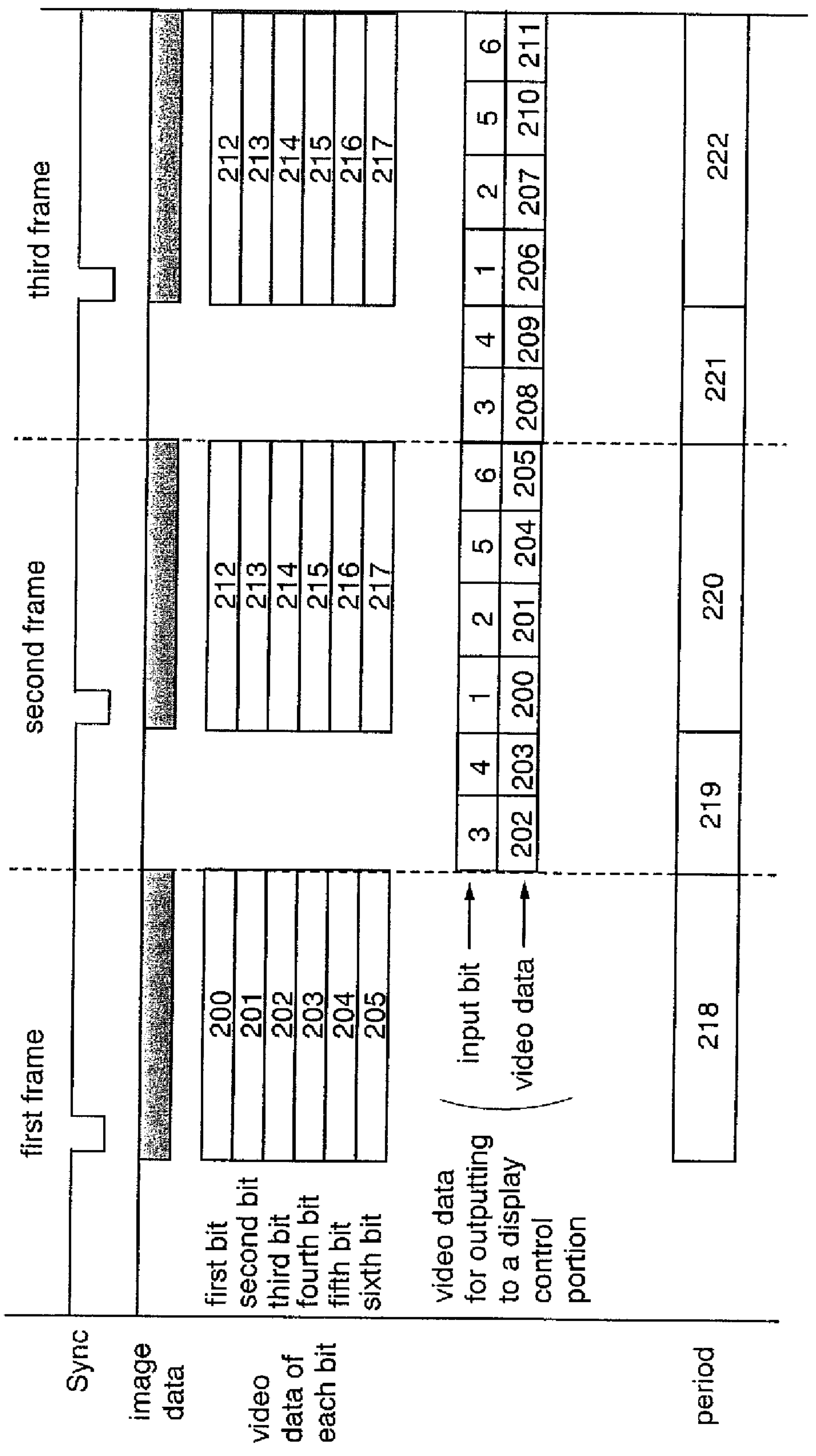
FIG. 2 is a timing chart showing an operation of a display device control circuit using the present invention.

In FIG. 2, a data 200 of a first bit, a data 201 of a second bit, a data 202 of a third bit, a data 203 of a fourth bit, a data 204 of a fifth bit, and a data 205 of a sixth bit of format-converted video data in a first frame are output from the video data format conversion portion 101 during a period other than a retrace period in the first frame, and are stored in a video data storage portion. In a similar manner, a data 206 of a first bit, a data 207 of a second bit, a data 208 of a third bit, a data 209 of a fourth bit, a data 210 of a fifth bit, and a data 211 of a sixth bit of format-converted video data in a second frame are output from the video data format conversion portion 101 during a period other than a retrace period 219 in the second frame, and are stored in the video data storage portion. Further, in a similar manner, a data 212 of a first bit, a data 213 of a second bit, a data 214 of a third bit, a data 215 of a fourth bit, a data 216 of a fifth bit, and a data 217 of a sixth bit of format-converted video data in a third frame are output from the video data format conversion portion 101 during a period other than a retrace period 221 in the third frame, and are stored in the video data storage portion.

At this time, when the data of the third bit and the data of the fourth bit of the video data are given focus, among signals that are output from the video data storage portion to the display panel via the display control portion, the data 202 of the third bit and the data 203 of the fourth bit in the first frame are written in the video data storage portion during a period 218, and reading thereof from the video data storage portion to the display control portion is completed during the period 219.

Also, in a similar manner, the data 208 of the third bit and the data 209 of the fourth bit in the second frame are written in the video data storage portion during a period 220, and reading thereof from the video data storage portion to the display control portion is completed during a period 221. Further, the data 214 of the third bit and the data 215 of the fourth bit in the third frame are written in the video data storage portion during a period 222.

The data 202 of the third bit and the data 203 of the fourth bit in the first frame are supplied to the display panel via the display control portion during the period 219, and they are not supplied to the display panel during the period 220. In a similar manner, the data 208 of the third bit and the data 209 of the fourth bit in the second frame are supplied to the display panel via the display control portion during the period 221, and they are not supplied to the display panel during the period 222. For the foregoing data 202 of the third bit and the data 203 of the fourth bit, it is not necessary to store the n-th frame gray scale data and the (n+1)th frame gray scale data in separate memories during the period 220 and the period 222, and the data of the third bit and the data of the fourth bit can be allocated to writing regions of the third bit and the fourth bit, using the memory regions 119 and 120 of the third video data storage portion 104.

Note that in this embodiment mode, in regards to the data 202 of the third bit and the data 203 of the fourth bit, an example where video data supplied to the display panel via the display control portion during a retrace period, which is a period other than a display period in one frame period (a period of one cycle of SYNC (vertical synchronizing signal) in FIG. 2), is stored in the third video data storage portion 104 is shown for description. However, the present invention is not limited thereto, and if they are video data that are supplied to the display panel via the display control portion during the period other than the display period, even if they are video data in the n-th frame (n is a natural number) and the (n+1)th frame, they can be stored in the third video data storage portion 104 as video data of an i-th bit (i is $1<i<m$; in a case where the video data is format-converted to m bits).

Figure 3A:
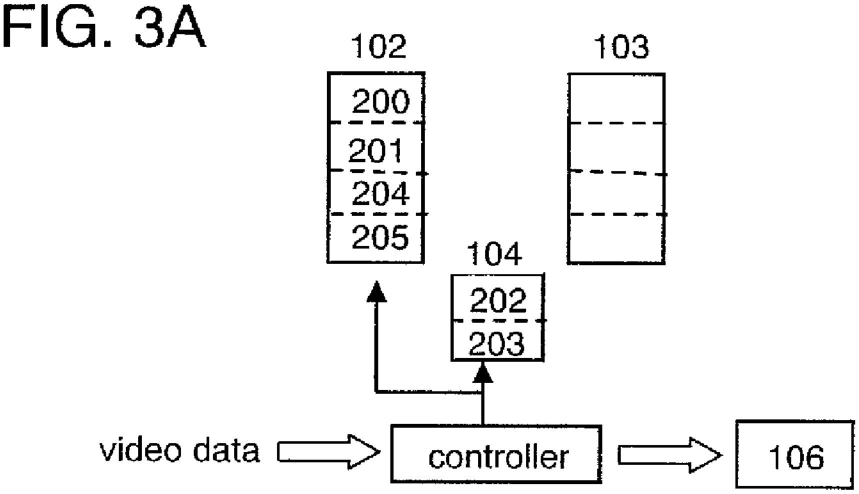
FIGS. 3A to 3C are each a block diagram showing a flow of operation of a display device control circuit using the present invention.
Figure 3B:
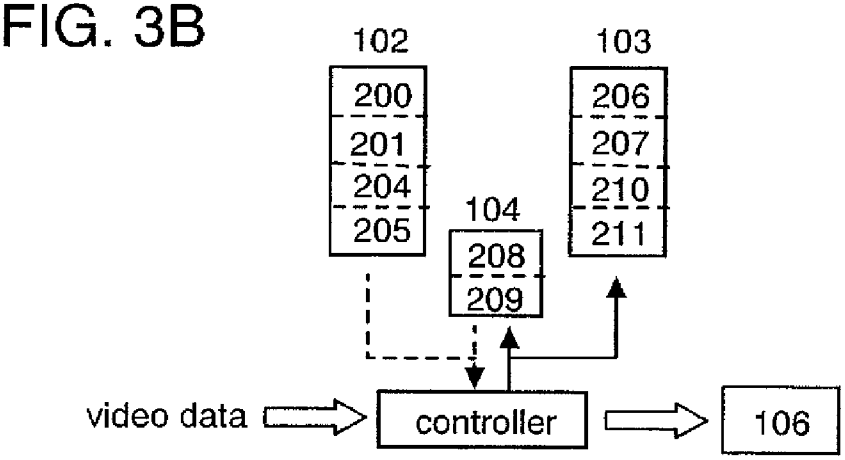
Figure 3C:
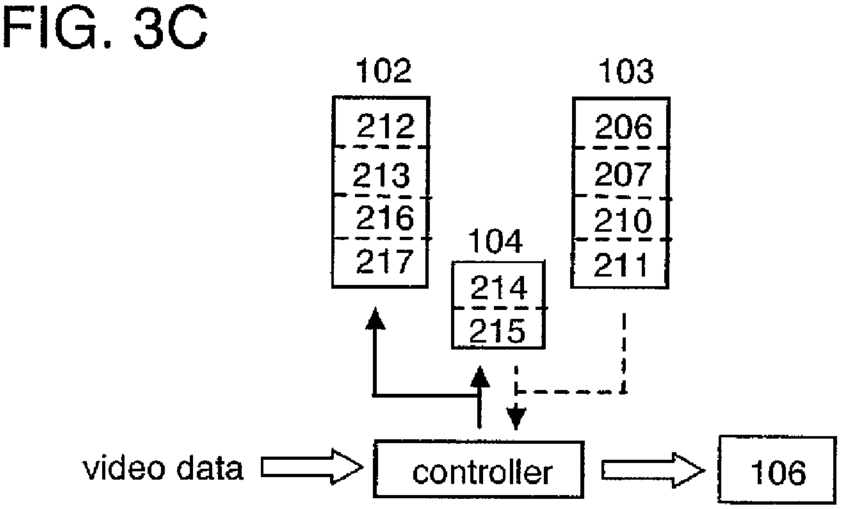

FIGS. 3A to 3C describe a flow of data that is written in the first video data storage portion 102, the second video data storage portion 103, and the third video data storage portion 104. Note that in FIGS. 3A to 3C, the video data format conversion portion 101 and the display control portion 105 in FIG. 1 are collectively and simply called a controller.

FIG. 3A describes a state in the period 218 and the period 219 of the timing chart. During a period in the second frame when video data is not being transmitted, in other words during a retrace period, the data 202 of the third bit and the data 203 of the fourth bit to be supplied to the display panel are stored in the third video data storage portion 104. Also, the data 200 of the first bit, the data 201 of the second bit, the data 204 of the fifth bit, and the data 205 of the sixth bit which are the remaining video data, are stored in the first video data storage portion 102.

FIG. 3B describes a state in the period 220 and the period 221 of the timing chart. Format-converted video data is read from the first video data storage portion 102 and the third video data storage portion 104, and output to the display panel via the display control portion. Subsequently, in the third video data storage portion 104 by which video data of the second frame is received, the data 208 of the third bit and the data 209 of the fourth bit to be supplied to the display panel are stored during a period in the third frame when video data is not being transmitted, in other words during a retrace period. Also, the remaining gray scale data are stored as the data 206 of the first bit, the data 207 of the second bit, the data 210 of the fifth bit, and the data 211 of the sixth bit in the second video data storage portion.

FIG. 3C describes a state in the period 222 of the timing chart. Format-converted video data is read from the second video data storage portion 103 and the third video data storage portion 104, and output to the display panel via the display control portion. Subsequently, in the third video data storage portion 104 by which video data of the third frame is received, the data 214 of the third bit and the data 215 of the fourth bit to be supplied to the display panel are stored during a period when video data of a subsequent frame is not being transmitted, in other words during a retrace period. Also, the remaining gray scale data are stored as the data 212 of the first bit, the data 213 of the second bit, the data 216 of the fifth bit, and the data 217 of the sixth bit in the first video data storage portion 102.

As described using FIGS. 1 to 3C, by the present invention, data of an arbitrary gray scale bit is output to the third video data storage portion 104 via the display control portion during a retrace period in one frame period, which is a period other than a display period, and data of an arbitrary gray scale bit of a subsequent frame can be stored. In other words, in the third video data storage portion 104, data of an arbitrary gray scale bit in the n-th frame (n is a natural number) and the (n+1)th frame can be retained. Therefore, data can be input to and output from the third video data storage portion 104 without using a selection circuit such as a selector or a tristate buffer.

In the conventional example, separate storage portions are provided for writing and reading of video data. For example, with a 6-bit video data, it is necessary to secure storage portions of 12 bits for reading and writing. In this embodiment mode of the present invention, reading and writing of data of an arbitrary gray scale bit in the n-th frame (n is a natural number) and the (n+1)th frame can both be carried out in the same storage portion. In other words, in this embodiment mode, although the third video data storage portion is provided in excess than the conventional example, it is acceptable as long as a total of ten bits of a storage portion are provided for reading and writing; therefore, the storage portion can be reduced by two bits.

According to the present invention, in a control circuit of a display device, video data of an arbitrary bit in the n-th frame and video data of an arbitrary bit in the (n+1)th frame can be stored in a common memory, and reading from and writing in the memory can be carried out. Consequently, compared to the case of simply providing necessary memory in addition, efficient use of a physical region of the memory is possible. Therefore, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Also, according to the present invention, in a control circuit of a display device, video data of an arbitrary bit in the n-th frame and video data of an arbitrary bit in the (n+1)th frame are not necessary to be selected by a selection circuit such as a selector. Consequently, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Embodiment Mode 2

An embodiment mode of the present invention that is different from Embodiment Mode 1 is described.

Figure 4:
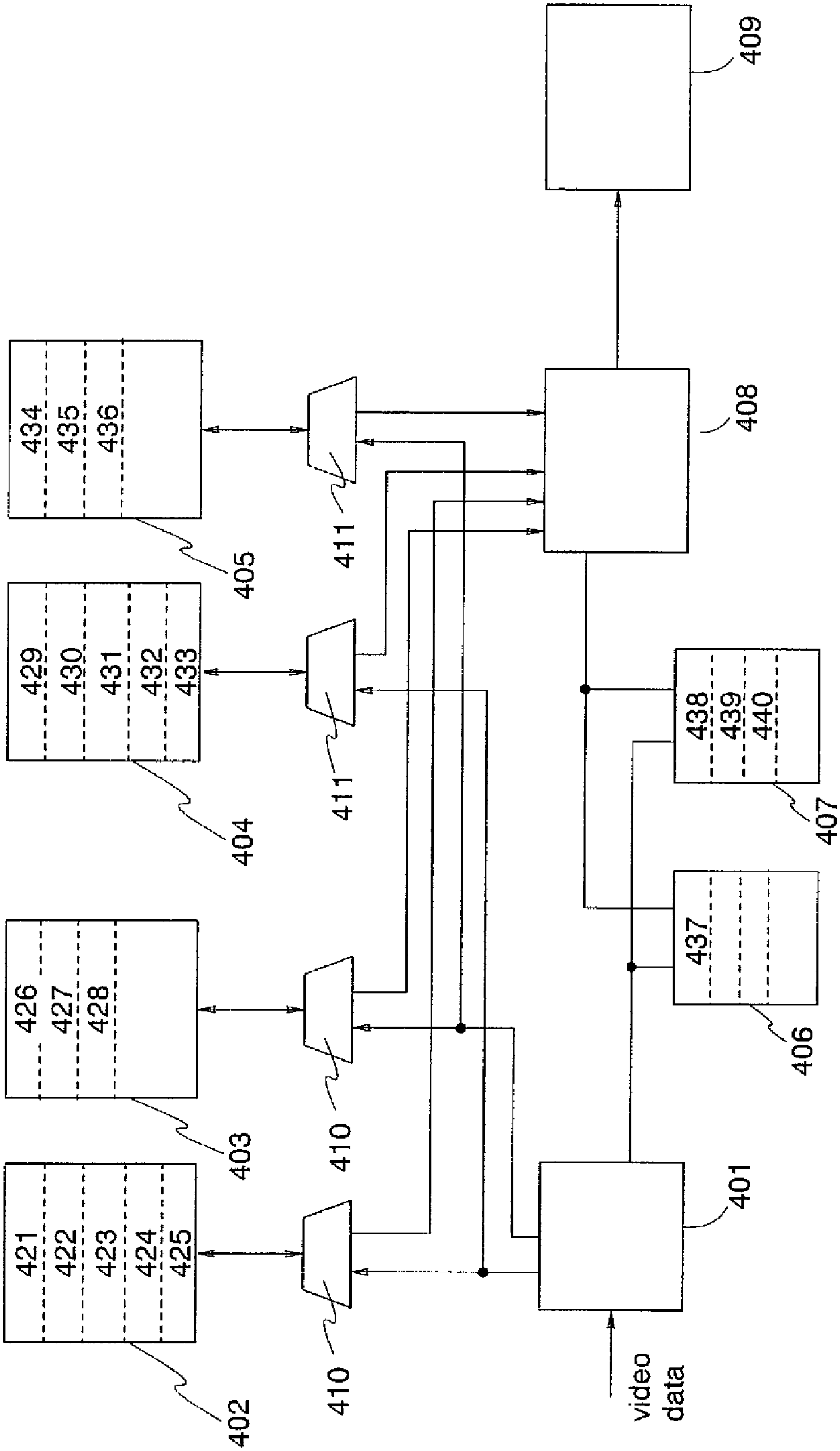
FIG. 4 is a block diagram showing an embodiment mode using the present invention.

FIG. 4 schematically shows of a structural example of a control circuit of a display device according to the present invention. This control circuit is structured by a video data format conversion portion 401, a first video data storage portion 402, a second video data storage portion 403, a third video data storage portion 404, a fourth video data storage portion 405, a fifth video data storage portion 406, a sixth video data storage portion 407, a display control portion 408, and a display panel 409. When the video data format conversion portion 401 receives video data, the video data format conversion portion 401 converts a format of the video data into a format of a video data with which gray scale expression in a pixel of the display panel is possible, for example, into a format of a video data for time gray scale display if a display device is of a time gray scale method. The video data format conversion portion 401 as a writing means writes the format-converted video data in the first video data storage portion 402 and the second video data storage portion 403; or in the third video data storage portion 404 and the fourth video data storage portion 405, at a timing of a memory selection signal via a selector 410 or a selector 411, respectively, which is a selection means. Further, the video data format conversion portion 401 as a writing means writes video data for time gray scale display in the fifth video data storage portion 406 and the sixth video data storage portion 407.

Note that instead of the selector 410 and the selector 411, another connection control means such as an analog switch or a tristate buffer may be used.

The display control portion 408 which is a display control means reads video data from any of the first video data storage portion 402 and the second video data storage portion 403, or the third video data storage portion 404 and the fourth video data storage portion 405, via the selector 411, and outputs the video data to the display control portion. Then, the display control portion 408 transmits video data that is selected by the selector 411 to the display panel 409 in synchronization with a timing of display.

Note that in this embodiment mode, a description is made on an example of converting video data that is input to the video data format conversion portion 401 into a 6-bit digital time gray scale data, to also make a comparison with FIG. 11 which is a conventional example. Of course, video data input to the format conversion portion is not limited to that of six bits, if a format of the video data is converted into that for a time gray scale method or an area gray scale method.

A point that is particularly different from a conventional technique is a point that the fifth video data storage portion 406 and the sixth video data storage portion 407 are provided. In an address region of each of the fifth video data storage portion 406 and the sixth video data storage portion 407, video data of an i-th bit (i is $1<i<6$; in a case where the video data is format-converted to six bits) in an n-th frame (n is a natural number) and video data of an i-th bit in an (n+1)th frame are stored. In other words, video data of the n-th frame and the (n+1)th frame are stored in common in the fifth video data storage portion 406 and the sixth video data storage portion 407.

Subsequently, a circuit structure is described using FIG. 4. First, video data is input to the video data format conversion portion 401. The video data format conversion portion 401 carries out format conversion of the video data into video data with which gray scale expression is possible, for example, into video data for time gray scale display if a display device is of a time gray scale method, and data of each gray scale bit is written in the first video data storage portion 402, the second video data storage portion 403, the third video data storage portion 404, the fourth video data storage portion 405, the fifth video data storage portion 406, or the sixth video data storage portion 407. Further, at the same time, video data written in the first video data storage portion 402, the second video data storage portion 403, the third video data storage portion 404, the fourth video data storage portion 405, the fifth video data storage portion 406, or the sixth video data storage portion 407 is read by the display control portion 408, the video data is output to the display panel 409.

Here, a region of a memory to which format-converted video data is written is described. The first video data storage portion 402 includes a memory region 421, a memory region 422, a memory region 423, a memory region 424, and a memory region 425, and in a similar manner, the second video data storage portion 403 includes a memory region 426, a memory region 427, and a memory region 428. Also, the third video data storage portion 404 includes a memory region 429, a memory region 430, a memory region 431, a memory region 432, and a memory region 433. Further, the fourth video data storage portion 405 includes a memory region 434, a memory region 435, and a memory region 436. The fifth video data storage portion 406 includes a memory region 437. The sixth video data storage portion 407 includes a memory region 438, a memory region 439, and a memory region 440. Video data of a first half of a period of the n-th frame is stored in the first video data storage portion 402 and video data of a second half of the period of the n-th frame is stored in the second video data storage portion 403. Also, video data of a first half of a period of an (n+1)th frame is stored in the third video data storage portion 404 and video data of a second half of the period of the (n+1)th frame is stored in the fourth video data storage portion 405. Video data of the n-th frame and video data of the (n+1)th frame during a period in one frame period when video data of one image is not being received, in other words a period in which video data is output to a display panel and the image is not being received, are stored in the fifth video data storage portion 406 and the sixth video data storage portion 407.

Subsequently, a timing chart of video data is described with reference to FIG. 5.

Figure 5:
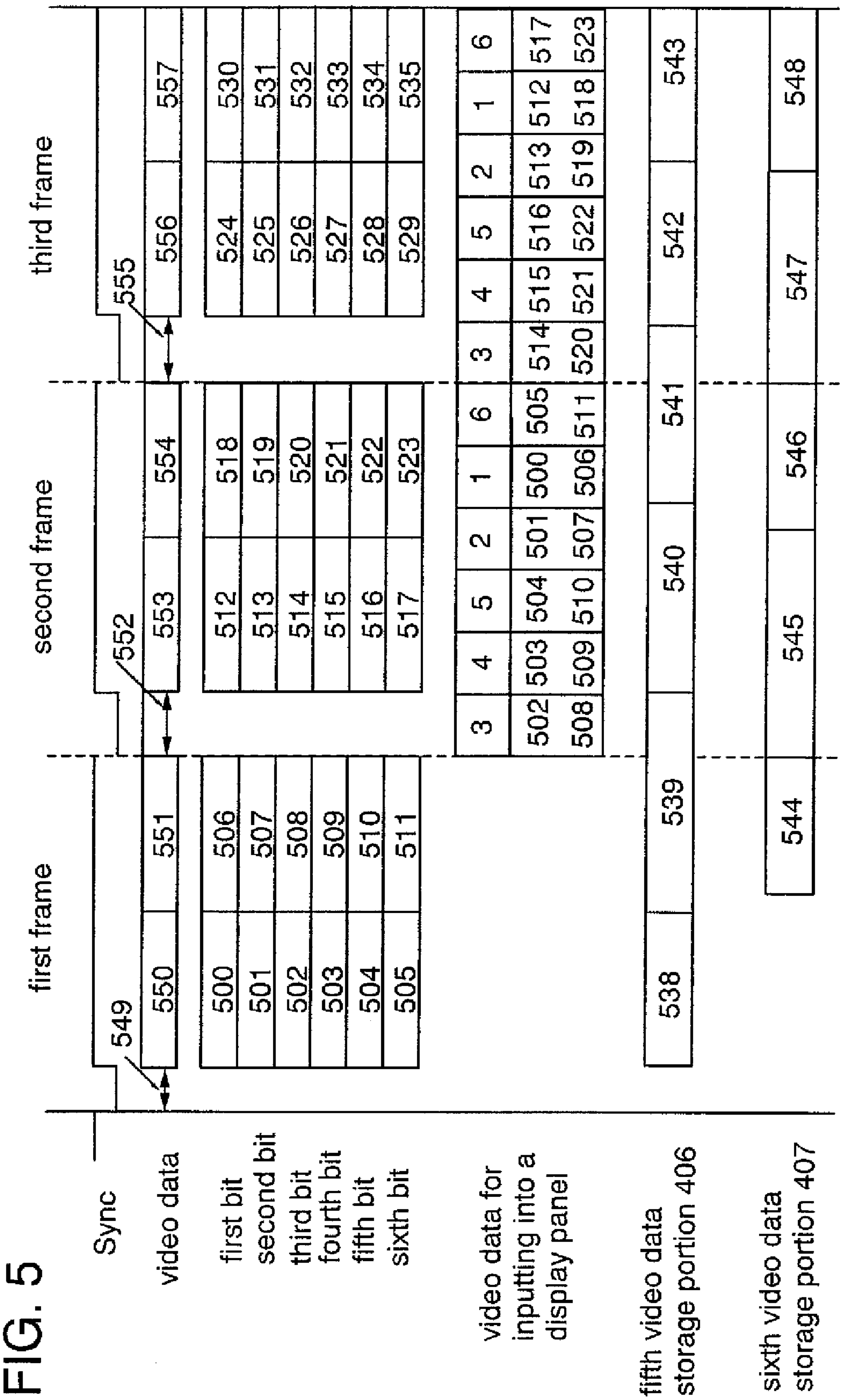
FIG. 5 is a timing chart showing an embodiment mode using the present invention.

In FIG. 5, a data 500 of a first bit, a data 501 of a second bit, a data 502 of a third bit, a data 503 of a fourth bit, a data 504 of a fifth bit, and a data 505 of a sixth bit of format-converted video data 550 in a first half of a period of a first frame are output from the video data format conversion portion 401 during the first half of the period other than a retrace period 549 in the first frame, and are stored in a video data storage portion. Also, a data 506 of a first bit, a data 507 of a second bit, a data 508 of a third bit, a data 509 of a fourth bit, a data 510 of a fifth bit, and a data 511 of a sixth bit of format-converted video data 551 in a second half of the period of the first frame are output from the video data format conversion portion 401 during the second half of the period other than the retrace period 549 in the first frame, and are stored in the video data storage portion. In a similar manner, a data 512 of a first bit, a data 513 of a second bit, a data 514 of a third bit, a data 515 of a fourth bit, a data 516 of a fifth bit, and a data 517 of a sixth bit of format-converted video data 553 in a first half of a period of a second frame are output from the video data format conversion portion 401 during the first half of the period other than a retrace period 552 in the second frame, and are stored in a video data storage portion. Also, a data 518 of the first bit, a data 519 of the second bit, a data 520 of the third bit, a data 521 of the fourth bit, a data 522 of the fifth bit, and a data 523 of the sixth bit of format-converted video data 554 in a second half of the period of the second frame are output from the video data format conversion portion 401 during the second half of the period other than the retrace period 552 in the second frame, and are stored in the video data storage portion. Further, in a similar manner, a data 524 of the first bit, a data 525 of the second bit, a data 526 of the third bit, a data 527 of the fourth bit, a data 528 of the fifth bit, and a data 529 of the sixth bit of format-converted video data 556 in a first half of a period of a third frame are output from the video data format conversion portion 401 during the first half of the period other than a retrace period 555 in the third frame, and are stored in the video data storage portion. Furthermore, a data 530 of the first bit, a data 531 of the second bit, a data 532 of the third bit, a data 533 of the fourth bit, a data 534 of the fifth bit, and a data 535 of the sixth bit of format-converted video data 557 in a second half of the period of the third frame are output from the video data format conversion portion 401 during the second half of the period other than the retrace period 555 in the third frame, and are stored in the video data storage portion.

Note that the phrase "video data of a first half of a period (or a second half of a period) of an x-th frame" does not mean that data amount of the video data of the first half of the period and the second half of the period are the same, and distribution thereof can be different depending on a memory region of a video data storage portion to be used. Therefore, by changing the division distribution of video data, a specification of the video data storage portion to be used can be changed, which is favorable.

At this time, among signals that are output from the video data storage portion to the display panel via the display control portion, the data 502 of the third bit in the first half of the period of the first frame; the data 508 of the third bit in the second half of the period of the first frame; the data 509 of the fourth bit in the second half of the period of the first frame; and the data 510 of the fifth bit in the second half of the period of the first frame, of the video data, are given focus. Here, the data 502 of the third bit in the first half of the period of the first frame is written in the video data storage portion during a period 538, and reading thereof from the video data storage portion to the display control portion is completed in a period 539. The data 508 of the third bit in the second half of the period of the first frame, the data 509 of the fourth bit in the second half period of the first frame, and the data 510 of the fifth bit in the second half of the period of the first frame are written in the video data storage portion during a period 544, and reading thereof from the video data storage portion to the display control portion is completed during a period 545.

Also, in a similar manner, the data 514 of the third bit in the first half of the period in the second frame is written in a video data storage portion during a period 540, and reading thereof from the video data storage portion to the display control portion is completed during a period 541. The data 520 of the third bit in the second half of a period of the second frame, the data 521 of the fourth bit in the second half of the period of the second frame, and the data 522 of the fifth bit in the second half of the period of the second frame are written in the video data storage portion during a period 546, and reading thereof from the video data storage portion to the display control portion is completed during a period 547.

Note that in this embodiment mode, in regards to the data 502 of the third bit in the first half of the period of the first frame and the data 508 of the third bit in the second half of the period of the first frame, an example where video data supplied to a display panel via a display control potion during a retrace period, which is a period other than a display period in one frame period (a period of one cycle of SYNC (vertical synchronizing signal) in FIG. 5), are stored in the fifth video data storage portion 406 and the sixth video data storage portion 407 is shown for description. However, the present invention is not limited thereto, and if they are video data that are supplied to the display panel via the display control portion during the period other than the display period, even if they are video data of the n-th frame (n is a natural number) and the (n+1)th frame, they can be stored in the fifth video data storage portion 406 and the sixth video data storage portion 407 as video data of an i-th bit (i is $1<i<m$; in a case where the video data is format-converted to m bits).

Each of FIGS. 6A to 6D describes a flow of data that is written in the first video data storage portion 402, the second video data storage portion 403, the third video data storage portion 404, the fourth video data storage portion 405, the fifth video data storage portion 406, and the sixth video data storage portion 407. Note that in FIGS. 6A to 6D, the video data format conversion portion 401 and the display control portion 408 in FIG. 4 are collectively and simply called a controller.

Figure 6A:
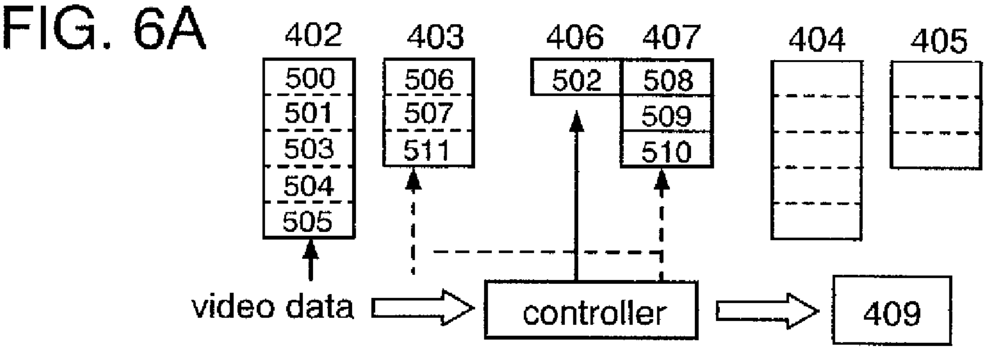
FIGS. 6A to 6D are each a block diagram showing an embodiment mode using the present invention.

FIG. 6A describes a state in the period 538 of the timing chart. During a period in the second frame period when video data is not being transmitted, in other words during a retrace period, the data 502 of the third bit in the first half of the period of the first frame period to be supplied to the display panel is stored in the fifth video data storage portion 406. Also, the data 500 of the first bit in the first half of the period of the first frame period, the data 501 of the second bit in the first half of the period of the first frame period, the data 503 of the fourth bit in the first half of the period of the first frame period, the data 504 of the fifth bit in the first half of the period of the first frame period, and the data 505 of the sixth bit in the first half of the period of the first frame period, which are the remaining video data, are stored in the first video data storage portion 402.

Also, during the first half of the period of the second frame period, the data 508 of the third bit in the second half of the period of the first frame period, the data 509 of the fourth bit in the second half of the period of the first frame period, and the data 510 of the fifth bit in the second half of the period of the first frame period are stored in the sixth video data storage portion 407. Further, the data 506 of the first bit in the second half of the period of the first frame period, the data 507 of the second bit in the second half of the period of the first frame period, and the data 511 of the sixth bit in the second half of the period of the first frame period, which are the remaining of the video data, are stored in the second video data storage portion 403.

Figure 6B:
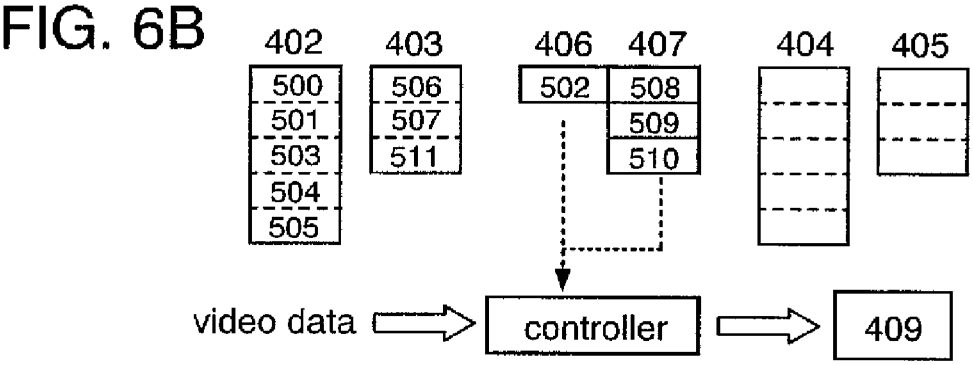

FIG. 6B describes a state in the retrace period 552 of the timing chart. The data 502 of the third bit in the first half of the period of the first frame period and the data 508 of the third bit in the second half of the period of the first frame period which are format-converted are read from the fifth video data storage portion 406 and the sixth video data storage portion 407, and output to the display panel via the display control portion.

Figure 6C:
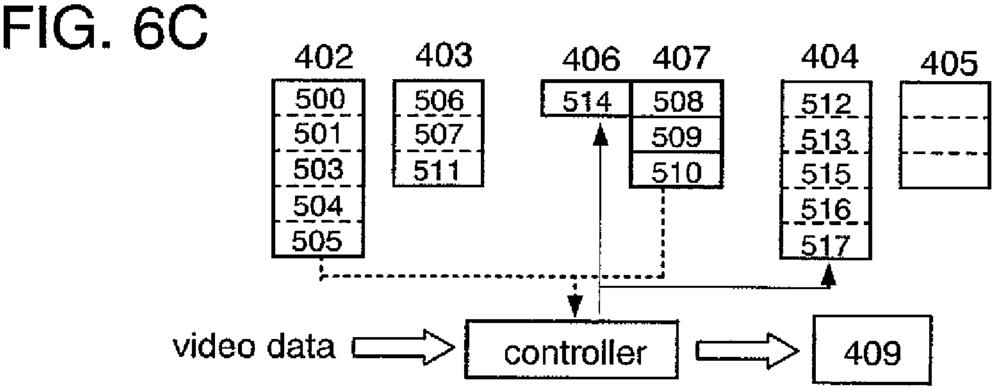

FIG. 6C describes a state in the period 540 of the timing chart. The data 503 of the fourth bit in the first half of the period of the first frame period, the data 509 of the fourth bit in the second half of the period of the first frame period, the data 504 of the fifth bit in the first half of the period of the first frame period, and the data 510 of the fifth bit in the second half of the period of the first frame period are read from the first video data storage portion 402 and the sixth video data storage portion 407, and output to the display panel via the display control portion. Further, during a period in the third frame period when video data is not being transmitted, in other words during a retrace period, the data 514 of the third bit in the first half of the period of the second frame to be supplied to the display panel is stored in the fifth video data storage portion 406. Also, the data 512 of the first bit in the first half of the period of the second frame period, the data 513 of the second bit in the first half of the period of the second frame period, the data 515 of the fourth bit in the first half of the period of the second frame period, the data 516 of the fifth bit in the first half of the period of the second frame period, and the data 517 of the sixth bit in the first half of the period of the second frame period, which are remaining gray scale data, are stored in the third video data storage portion 404.

Figure 6D:
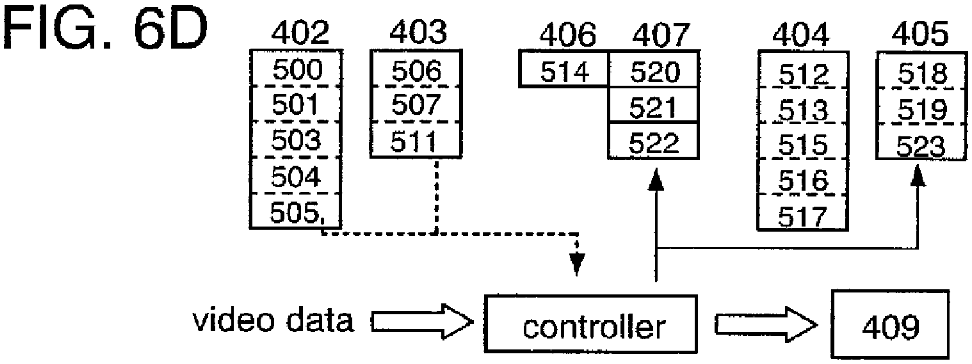

FIG. 6D describes a state in a period 554 of a timing chart. The data 500 of the first bit in the first half of the period of the first frame period, the data 506 of the first bit in the second half of the first frame period, the data 501 of the second bit in the first half of the period of the first frame period, the data 507 of the second bit in the second half of the period of the first frame period, the data 505 of the sixth bit in the first half of the period of the first period, and the data 511 of the sixth bit in the second half of a period of the first frame period are read from the first video data storage portion 402 and the second video data storage portion 403, and output to the display panel via the display control portion. Further, the data 520 of the third bit in the second half of the period of the second frame period, the data 521 of the fourth bit in the second half of the period of the second frame period, the data 521 of the fourth bit in the second half of the period of the second frame period, and the data 522 of the fifth bit in the second half period of the second frame period that are supplied to the display panel are stored in the fifth video data storage portion 406 during a first half of a period of the third frame period As described using FIGS. 4 to 6C, by the present invention, data of an arbitrary gray scale bit is output to the fifth video data storage portion 406 and the sixth video data storage portion 407 via the display control portion during a retrace period in one frame period, which is a period other than a display period, and during the first half of the period of the second frame, and data of an arbitrary gray scale bit of a subsequent frame can be stored. In other words, in the fifth video data storage portion 406 and the sixth video data storage portion 407, data of an arbitrary gray scale bit in the n-th frame (n is a natural number) and the (n+1)th frame can be retained. Therefore, data can be input to and output from the fifth video data storage portion 406 and the sixth video data storage portion 407 without using a selection circuit such as a selector or a tristate buffer.

In the conventional example, separate storage portions are provided for writing and reading of video data. For example, if a 6-bit video data is divided into a first half of a period and a second half of a period, it is necessary to secure storage portions of 12 bits for a storage portion for reading and writing. In this embodiment mode of the present invention, reading and writing of data of an arbitrary gray scale bit in the n-th frame (n is a natural number) and the (n+1)th frame can both be carried out in the same storage portion. In other words, in this embodiment mode, although the fifth video data storage portion 406 and the sixth video data storage portion 407 are provided in excess than the conventional example, it is acceptable as long as a total of 20 bits of a storage portion are provided for reading and writing; therefore, the storage portion can be reduced by four bits.

According to the present invention, in a control circuit of a display device, video data of an arbitrary bit in the n-th frame and video data of an arbitrary bit in the (n+1)th frame can be stored in a common memory, and reading from and writing in the memory can be carried out. Consequently, compared to the case of simply providing necessary memory in addition, efficient use of a physical region of the memory is possible. Therefore, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Also, according to the present invention, in a control circuit of a display device, video data of an arbitrary bit in the nth frame and in the (n+1)th frame are not necessary to be selected by a selection circuit such as a selector. Consequently, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Embodiment Mode 3

Figure 7:
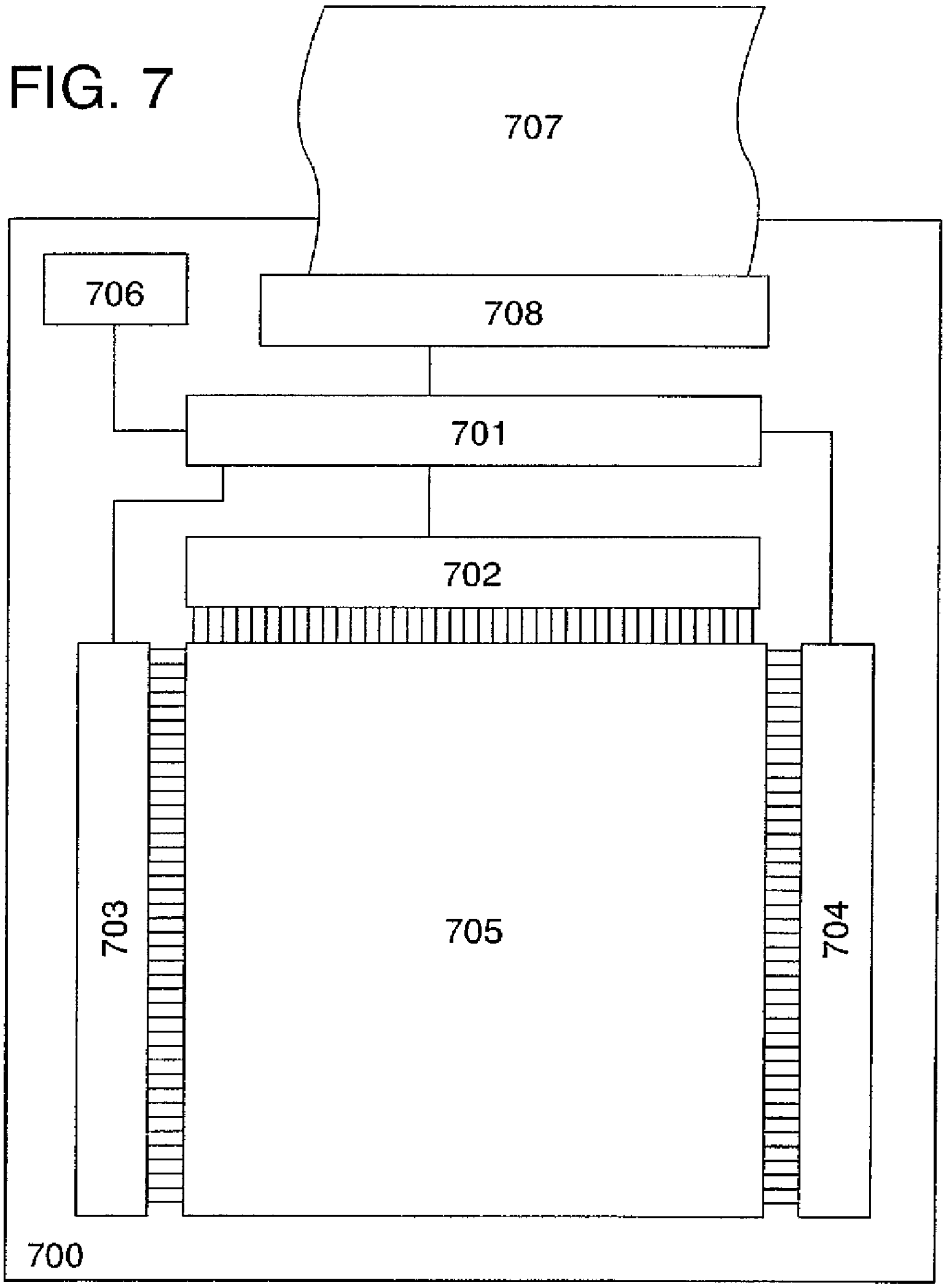
FIG. 7 is a figure showing one example of a display device using the present invention.

In this embodiment mode, an example of a display device using a control circuit of a display device and using an EL element in each pixel is shown in FIG. 7.

The display device includes a control circuit 701, a source signal line driver circuit 702, gate signal line driver circuits 703 and 704, a display portion 705, a memory 706, an FPC 707, and a connector 708. Each circuit of the display device is formed over a panel 700, or is provided externally.

An operation is described. Data and control signals sent from the FPC 707 through the connector 708 are input to the control circuit 701, and the data is rearranged for output in the memory 706 (storage portion), and then sent again to the control circuit 701. The control circuit 701 sends the data and signals used for display to the source signal line driver circuit 702, and the data signal line driver circuits 703 and 704 to carry out display in the display portion 705 using an EL element.

A known circuit can be used for the source signal line driver circuit 702 and the gate signal line driver circuits 703 and 704. Also, depending on a structure of a circuit, one gate signal line driver circuit may be provided.

Also, this embodiment mode can be applied in free combination with any content of the other embodiment modes in this specification. In other words, by applying a control circuit of a display device to the control circuit 701 of this embodiment mode, video data of an arbitrary bit in an n-th frame and an (n+1)th frame can be stored in a common memory, and reading from and writing in the memory can be carried out. Consequently, compared to the case of simply providing necessary memory in addition, efficient use of a physical region of the memory is possible. Therefore, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Also, according to the present invention, in a control circuit of a display device, video data of an arbitrary bit in the n-th frame and video data of an arbitrary bit in the (n+1)th frame are not necessary to be selected by a selection circuit such as a selector. Consequently, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Embodiment Mode 4

Figure 8:
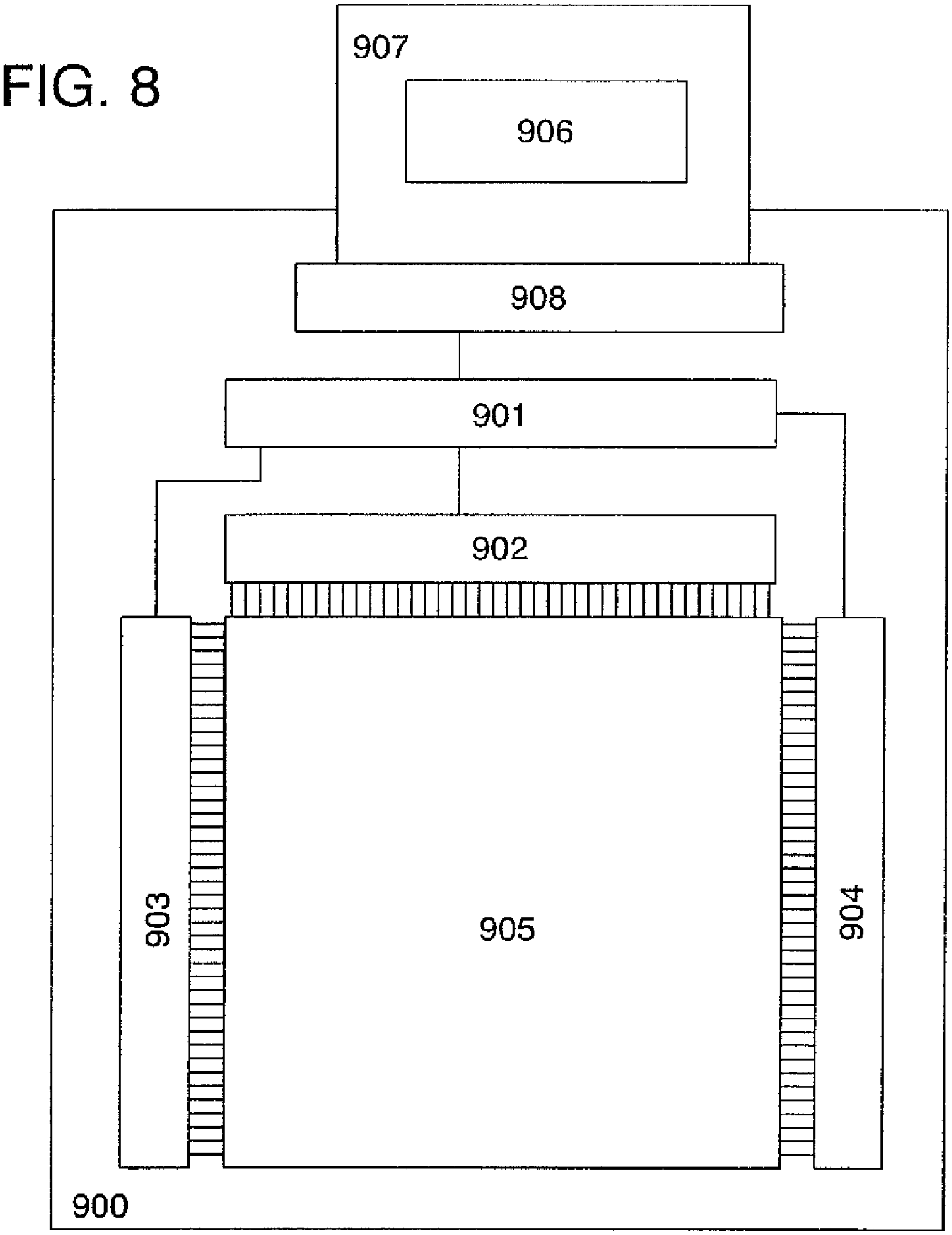
FIG. 8 is a figure showing one example of a display device using the present invention.

In this embodiment mode, among display devices using a control circuit of a display device and using an EL element in each pixel, an example that is different from that of another embodiment mode is shown in FIG. 8.

The display device includes a control circuit 901, a source signal line driver circuit 902, gate signal line driver circuits 903 and 904, a display portion 905, a memory 906, and a connector 908 including an FPC 907. Each circuit of the display device is formed over a panel 900, or is provided externally.

An operation is described. Data and control signals sent from the FPC 907 through the connector 908 are input to the control circuit 901, and the data is returned to the memory 906 in the FPC 907 so that the data is rearranged for output, and then sent again to the control circuit 901. The control circuit 901 sends the data and signals used for display to the source signal line driver circuit 902 and the gate signal line driver circuits 903 and 904 to carry out display in the display portion 905 using an EL element.

A difference from Embodiment Mode 3 is in that the memory 906 is incorporated in the FPC 907. Accordingly, downsizing of the display device can be achieved.

In a similar manner to Embodiment Mode 3, a known circuit can be used for the source signal line driver circuit 902 and the gate signal line driver circuits 903 and 904. Also, depending on a structure of a circuit, one gate signal line driver circuit may be provided.

Also, this embodiment mode can be applied in free combination with any content of other embodiment modes in this specification. In other words, by applying a control circuit of a display device to the control circuit 901 of this embodiment mode, video data of an arbitrary bit in an n-th frame and an (n+1)th frame can be stored in a common memory, and reading from and writing in the memory can be carried out. Consequently, compared to the case of simply providing necessary memory in addition, efficient use of a physical region of the memory is possible. Therefore, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Also, according to the present invention, in a control circuit of a display device, video data of an arbitrary bit in the n-th frame and video data of an arbitrary bit in the (n+1)th frame are not necessary to be selected by a selection circuit such as a selector. Consequently, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Embodiment Mode 5

Figure 9:
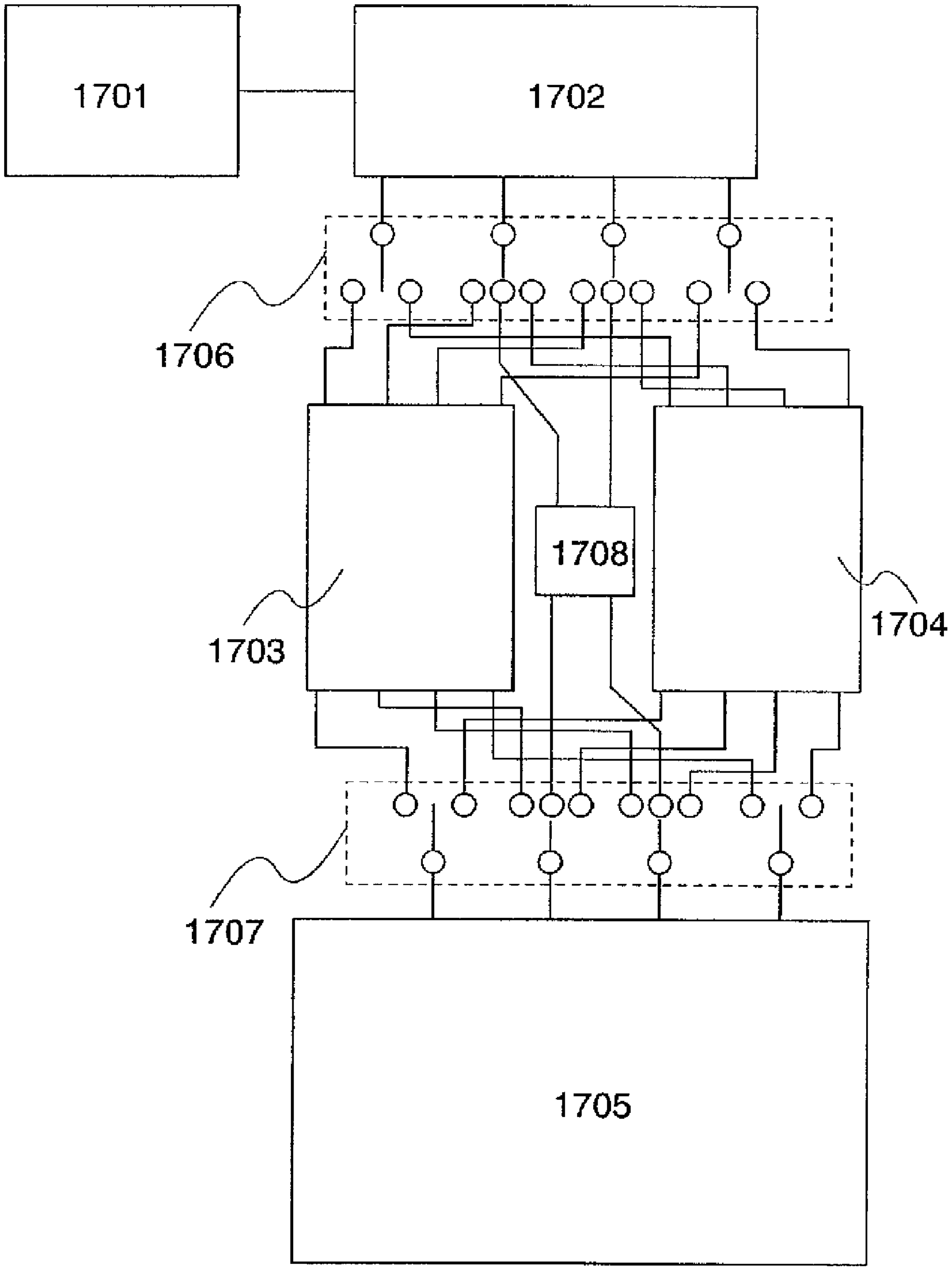
FIG. 9 is a figure showing one example of a display device using the present invention.

In this embodiment mode, among display devices using a control circuit of a display device and using an EL element in each pixel, an example of a structure of a control circuit that outputs to a display using an EL element and having a structure that is different from that of another embodiment mode is shown in FIG. 9.

A time gray scale display inevitably has a higher operating frequency compared to an analog display. In general, in order to obtain high image quality, it is necessary to suppress occurrence of pseudo contour, and accordingly it is necessary that there are ten or more sub-frames. Consequently, the operating frequency also needs to be ten times or more.

To carry out driving with such an operating frequency, it is necessary that an SRAM used for a storage portion to be used can also operate with high speed, and it is necessary to use an SRAM-IC for high speed.

However, an SRAM for high speed has high power consumption during retention, and it is particularly not suited for a mobile appliance. Further, in order to use an SRAM with low power consumption, it is necessary to reduce frequency even more.

As shown in FIG. 9, before writing digital video signals in a first video data storage portion 1703, a second video data storage portion 1704, and a third video data storage portion 1708, the digital video signals are converted from serial to parallel using a serial-parallel conversion circuit 1702. Subsequently, they are written in a display 1705 via switches 1706 and 1707.

By taking such measures, parallel reading with low frequency is possible also during reading; consequently, a low power consumption SRAM used in the storage portion can be used at low frequency, and electrical power of a mobile appliance can be lowered.

Further, this embodiment mode can be applied in free combination with any content of other embodiment modes in this specification. In other words, by applying a control circuit of a display device to the first video data storage portion 1703, the second video data storage portion 1704, and the third video data storage portion 1708 of this embodiment mode, video data of an arbitrary bit in an n-th frame and an (n+1)th frame can be stored in a common memory, and reading from and writing in the memory can be carried out. Consequently, compared to the case of simply providing necessary memory in addition, efficient use of a physical region of the memory is possible. Therefore, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Also, according to the present invention, in a control circuit of a display device, video data of an arbitrary bit in the n-th frame and video data of an arbitrary bit in the (n+1)th frame are not necessary to be selected by a selection circuit such as a selector. Consequently, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Embodiment 1

As an electronic appliance using the present invention, a camera such as a video camera or a digital camera, a goggle type display (head mounted display), a navigation system, an audio reproducing device (such as a car audio system or an audio component), a notebook personal computer, a game machine, a portable information terminal (a mobile computer, a cell phone, a portable game machine, an electronic book, or the like), an image reproducing device provided with a recording medium (specifically, a device that reproduces a recording medium such as a Digital Versatile Disc (DVD) and has a display for displaying the reproduced image), and the like are given. Specific examples of such electronic appliances are shown in FIGS. 10A to 10G.

Figure 10A:
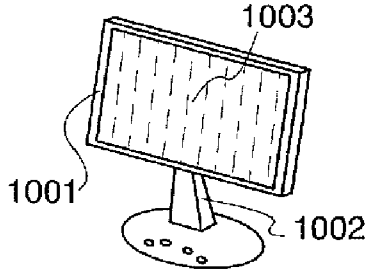
FIGS. 10A to 10G are each a figure showing an example of an electronic appliance using the present invention.

FIG. 10A shows a liquid crystal display or an OLED display that is structured by a housing 1001, a supporting base 1002, a display portion 1003, and the like. The present invention can be applied to a driver circuit of a display device including the display portion 1003.

Figure 10B:
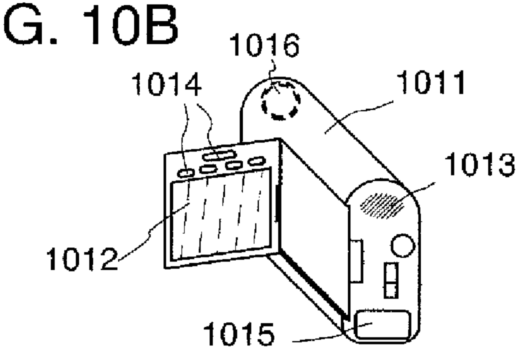

FIG. 10B shows a video camera that is structured by a main body 1011, a display portion 1012, an audio input 1013, an operation switch 1014, a battery 1015, an image receiving portion 1016, and the like. The present invention can be applied to a driver circuit of a display device including the display portion 1017.

Figure 10C:
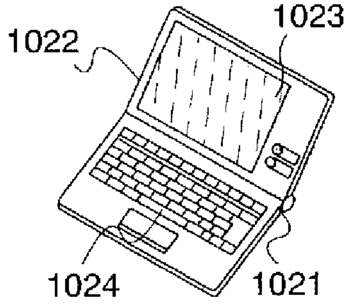

FIG. 10C shows a notebook personal computer that is structured by a main body 1021, a housing 1022, a display portion 1023, a keyboard 1024, and the like. The present invention can be applied to a driver circuit of a display device including the display portion 1023.

Figure 10D:
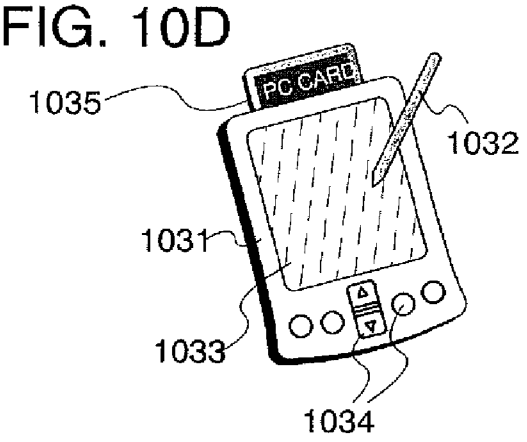

FIG. 10D shows a portable information terminal that is structured by a main body 1031, a stylus 1032, a display portion 1033, an operation button 1034, an external interface 1035, and the like. The present invention can be applied to a driver circuit of a display device including the display portion 1033.

Figure 10E:
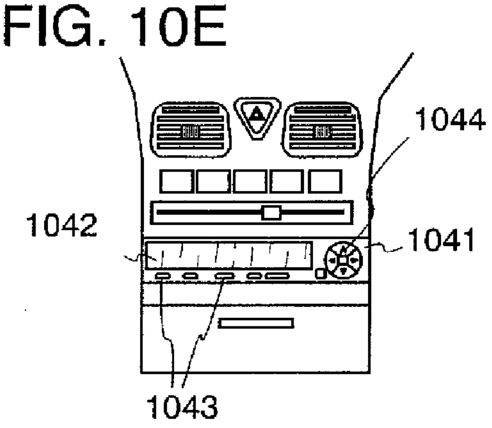

FIG. 10E shows an audio reproducing device, specifically, an audio device installed in a vehicle, that is structured by a main body 1041, a display portion 1042, operation switches 1043 and 1044, and the like. The present invention can be applied to a driver circuit of a display device including the display portion 1042. Also, although the audio device installed in a vehicle is given as an example, the audio reproducing device may be used for a portable type audio device or an audio device for domestic use.

Figure 10F:
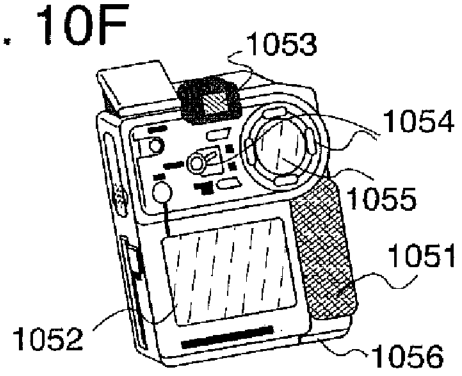

FIG. 10F shows a digital camera that is structured by a main body 1051, a display portion (A) 1052, an eye piece 1053, an operation switch 1054, a display portion (B) 1055, a battery 1056, and the like. The present invention can be applied to a driver circuit of a display device including the display portion (A) 1052 and the display portion (B) 1055.

Figure 10G:
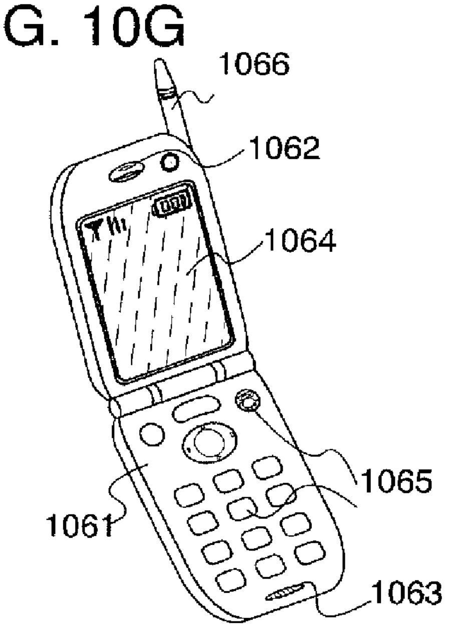

FIG. 10G shows a cell phone that is structured by a main body 1061, an audio output portion 1062, an audio input portion 1063, a display portion 1064, an operation switch 1065, an antenna 1066, and the like. The present invention can be applied to a driver circuit of a display device including the display portion 1064.

For a display device used in such electronic appliances, a plastic substrate with heat resistance can be used in addition to a glass substrate. Consequently, further reduction in weight can be achieved.

Note also that examples described in this embodiment are only a few examples, and the present invention is not limited to these uses.

Further, this embodiment mode can be applied in free combination with any content of other embodiment modes in this specification. Therefore, in a control circuit of a display device, video data of an arbitrary bit in an n-th frame and an (n+1)th frame can be stored in a common memory, and reading from and writing in the memory can be carried out. Consequently, compared to a case of simply providing necessary memory in addition, efficient use of a physical region of the memory is possible. Therefore, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

Also, according to the present invention, in a control circuit of a display device, video data of an arbitrary bit in the n-th frame and video data of an arbitrary bit in the (n+1)th frame are not necessary to be selected by a selection circuit such as a selector. Consequently, reduction in the number of mounting pins, simplification of a structure, and space saving of a circuit can be achieved, and an improvement in physical use efficiency of a memory becomes possible. As a result, downsizing, reduction in manufacturing cost, improvement in reliability, and reduction in power consumption of a display device and an electronic appliance including the control circuit of the present invention can be realized.

This application is based on Japanese Patent Application Ser. No. 2005-354222 filed in Japan Patent Office on Dec. 8 in 2005, the entire contents of which are hereby incorporated by reference.

What is claimed is:

1. A control circuit of a display device comprising:

first to sixth video data storage portions;

a video data format conversion portion for writing a first video data in the first video data storage portion, writing a second video data in the second video data storage portion, writing a third video data in the third video data storage portion, writing a fourth video data in the fourth video data storage portion, writing a fifth video data in the fifth video data storage portion and writing a sixth video data in the sixth video data storage portion;

a selection means for alternating between writing of the first video data and the second video data in the first video data storage portion and the second video data storage portion, and writing of the third video data and the fourth video data in the third video data storage portion and the fourth video data storage portion every one frame period; and a display control portion for alternating between reading of the first video data the second video data from the first video data storage portion and the second video data storage portion, and reading of the third video data and the fourth video data from the third video data storage portion and the fourth video data storage portion every one frame period, wherein the writing of the first video data and the second video data in the first video data storage portion and the second video data storage portion, and the writing of the third video data and the fourth video data in the third video data storage portion and the fourth video data storage portion are each sequentially carried out in one frame period, wherein the writing of the first video data and the second video data and the reading of the first video data and the second video data are alternately carried out, wherein the writing of the third video data and the fourth video data and the reading of the third video data and the fourth video data are alternately carried out, and wherein the fifth video data and the sixth video data are read from the fifth video data storage portion and the sixth video data storage portion by the display control portion during a retrace period.

2. A control circuit of a display device according to claim 1, wherein the control circuit controls a display panel in which a light emitting element is provided for every pixel.

3. A control circuit of a display device according to claim 2, wherein the light emitting element is an OLED element.

4. An electronic appliance having the control circuit of the display device according to claim 1, wherein the electronic appliance is one selected from the group consisting of a display such as a liquid crystal display and an OLED display, a camera such as a digital camera, a video camera, a goggle type display, a navigation system, an audio reproducing device, a notebook personal computer, an electronic book, a cell phone, a portable game machine, and an image reproducing device provided with a recording medium.

5. A control circuit of a display device according to claim 1, wherein the selection means is one selected from the group consisting of a selector, an analog switch, and a tristate buffer.

* * * * *